United States Patent [19]

Godfrey et al.

[11] 4,353,851

[45] Oct. 12, 1982

[54] ON-LINE RECLAIM METHOD

[75] Inventors: Jack F. Godfrey; Charles L. Grant, both of Hazlehurst, Ga.

[73] Assignee: Standard Oil Company (Indiana)

[21] Appl. No.: 41,606

[22] Filed: May 23, 1979

Related U.S. Application Data

[63] Continuation of Ser. No. 848,742, Nov. 4, 1977, abandoned.

[51] Int. Cl.³ .............................................. B29C 29/00
[52] U.S. Cl. ..................................... 264/37; 264/140; 264/141; 366/76
[58] Field of Search ........................ 264/37, 140, 141; 366/76

[56] References Cited

U.S. PATENT DOCUMENTS

| | | | |
|---|---|---|---|
| 3,797,702 | 3/1974 | Robertson | 222/136 |
| 3,976,730 | 8/1976 | Cushing | 264/37 |
| 4,013,745 | 3/1977 | Brinkman et al. | 264/37 |
| 4,014,462 | 3/1977 | Robertson | 425/205 |
| 4,065,532 | 12/1977 | Wild et al. | 264/37 |
| 4,175,870 | 11/1979 | Warzel | 366/76 |

OTHER PUBLICATIONS

Boyden, Automatic Recycling, In Modern Plastics Encyclopedia, 1965, pp. 904–906.

*Primary Examiner*—James H. Derrington
*Attorney, Agent, or Firm*—David E. Boone; William T. McClain; William H. Magidson

[57] ABSTRACT

An improved method and machine for reclaiming in an on-line configuration both oriented and unoriented film produced on an extrusion line, in general, and an improved means within an on-line reclaim system for transferring both virgin resin and chopped reclaim to an in-line extruder, in particular, are disclosed.

3 Claims, 2 Drawing Figures

ON-LINE RECLAIM METHOD

This is a continuation of application Ser. No. 848,742, filed Nov. 4, 1977, now abandoned.

BACKGROUND OF THE INVENTION

1. Field of the Invention

The field of this invention includes methods and machines for on-line recycling of both oriented and unoriented film produced on a film extrusion line.

2. Prior Art

Systems for on-line recycling of edge trim produced by a film extrusion line are known and work reasonably well. However, such systems have been generally unsuccessful when applied to oriented tapes produced from oriented or unoriented slit films. The reason apparently being that static chargess from the oriented film results in "balling" or "bridging" (terms common to the art) that cause blockages in these systems. Such blockages cause the output of an extruder to surge (too much flow) or to starve (too little flow).

U.S. Pat. No. 4,014,461 (1977) and U.S. Pat. No. 3,797,702 (1974) both to J. D. Robertson disclose an example of a recycle or reclaim system which works well on edge trim recycled from a film extrusion line, but eventually has problems during production due to bridging when low density reclaim contains oriented film in addition to edge trim.

"Low density reclaim" means chopped film which has an apparent density of less than about 9 pounds/cubic foot (lb/cf). The apparent density is the weight of chopped film which without either induced settling thereof such as by soaking of the container or pressure applied thereto just fills a 1 cubic foot container when added thereto after a loose freefall of at least 2 inches but not in excess of about 12 inches.

BRIEF DESCRIPTION OF THE INVENTION

An object of this invention is to provide an automatic reclaim system suitable for use in an on-line configuration with a film extrusion line.

Another object of this invention is to provide a method and machine capable of recycling in an on-line configuration with a film extrusion line both oriented and unoriented slit films, which avoids or substantially lessens problems of prior art systems.

Another object of this invention is to provide an on-line reclaim method and system wherein the rate of recycling is coupled to the operating speed of an in-line extruder.

Another object of this invention is to avoid most of the bridging problems that otherwise frequently interfere with extruder feeding when low density reclaim with an apparent density as low as about 6 lb/cf is recycled.

Another object of this invention is to provide an on-line reclaim method and machine for film produced on an extrusion line wherein at least 1½, and preferably at least about 2 or 4, and more preferably at least about 5 or more parts by weight of virgin resin pellets to each part by weight of said film in the form of chopped reclaim are positively fed as a mixture into an extruder of said line.

Other objects of this invention will be clear from this Specification.

Generally, the above objects for reclaiming a portion of oriented and unoriented film produced on an extrusion line can be achieved by the process of this invention which comprises: entangling said oriented and unoriented film to form a collection thereof containing at least 25% by weight unoriented film; chopping said collection to form a chopped reclaim; transferring, as for example by means of an auger, at least 1½ parts by weight of a virgin resin to a mixing zone while simultaneously transferring, as for example by means of a carrier stream, 1 part by weight of said chopped reclaim to said mixing zone; mixing said virgin resin and said chopped reclaim to form a mixture thereof; transferring, as for example by means of one or more augers, said mixture to a plasticization zone which is within said extrusion line; and transferring, as for example gravitationally, additional virgin resin to said plasticization zone downstream from where said mixture enters said plasticization zone. "Downstream" means throughout this Specification and Claims the direction of flow of material which is being plasticated by said means for plasticizing. An example of the mixing zone is a cyclone which is adapted both to separate chopped reclaim from a carrier stream and to mix the incoming chopped reclaim and virgin resin to form a mixture thereof.

Generally, the above objects can be achieved when the improved machine of this invention is used in an on-line configuration with a system for reclaiming a portion of oriented and unoriented film produced on an extrusion line. This system has: at least one carrier stream which can transfer a portion of said film to a means for both entangling said oriented and unoriented film to form a collection thereof containing at least 25% by weight of unoriented film and chopping said collection to form a chopped reclaim therefrom; and at least one other carrier stream which can transfer the chopped reclaim to a means for transferring both virgin resin and chopped reclaim to a means for plasticizing such materials which means is a part of said line. The improved machine of this invention is an improvement to said means for transferring both virgin resin and chopped reclaim which comprises: A first container which is adapted to receive and to store a virgin resin and to transfer both a first and a second part of said virgin resin; A second container which is adapted both to separate incoming chopped reclaim from said at least one other carrier stream and to induce mixing of any virgin resin simultaneously entering therein; A first means for transferring which is adapted to transfer the first part of said virgin resin from the first container to the second container is such a manner that virgin resin and chopped reclaim which simultaneously enters therein become intermixed so as to form a mixture therein; A second means for transferring which is adapted to transfer said mixture from said second container to said means for plasticizing; and A third means which is adapted to transfer the second part of said virgin resin from the first container to a means for plasticizing at a location downstream from where said mixture enters said means for plasticizing.

It is to be noted that preferably all rotary power both to the first and at least a part of the second means for transferring is transferred by a drive means from the screw of an in-line means for plasticization, i.e., an extruder. An example of this drive means comprises a first, second, third and fourth cog wheel, a first chain and a second chain. The first cog wheel is attached to the screw of said extruder so as to rotate as the screw rotates. The first chain is adapted to couple the first cog wheel, which is preferably torque limiting, and the second cog wheel so as to cause rotation of the second cog wheel in response to any rotary movement of the first cog wheel. The second cog wheel is attached to a first powered auger, which comprises a part of said second means for transferring, so as to cause rotation thereof in response to any rotary movement of the second cog wheel. The third cog wheel is attached to the first powered auger so as to rotate in response to rotary movement of the first powered auger. The second chain is adapted to couple the third cog wheel and the fourth cog wheel so as to cause rotary motion of the fourth cog wheel in response to any rotaty movement of the third cog wheel. The fourth cog wheel is attached to the powered auger of the first means for transferring so as to cause rotation thereof.

When used in an on-line system for reclaiming a portion of oriented and unoriented film produced on an extrusion line, which has at least one carrier stream that transfers a portion of said film to a means for both entangling said oriented and unoriented film to form a collection thereof containing at least 25% by weight of unoriented film and chopping said collection to form a chopped reclaim therefrom and at least one other carrier stream that transfers said chopped reclaim to a means for tranferring both virgin resin and said chopped reclaim to an in-line means for plasticizing such materials, a more specific embodiment of this invention involves an improvement to said means for transferring both virgin resin and said chopped reclaim. This more specific embodiment comprises: A first container which is adapted (i) to receive and to store virgin resin and (ii) to permit both transfer of a first portion of virgin resin to the interior of a first conduit and transfer a second portion of virgin resin gravitationally to the interior of a passageway; A cyclone which is adapted (i) to receive and to separate chopped reclaim from a carrier stream, (ii) to receive the first portion of said virgin resin from the first conduit so that such virgin resin and any chopped reclaim simultaneously being received in the cyclone become intermixed under the influence of the carrier stream so as to form a mixture thereof which collects within the cyclone, and (iii) to transfer this mixture to the interior of a second conduit; the aforesaid passageway, which is attached at one end to the first container and at the other end to the interior of the in-line means for plasticizing, is adapted to accommodate a third conduit with a third auger therein while transferring gravitationally a second portion of said virgin resin into the in-line means for plasticizing; A first conduit which is connected at one end to the first container and at the other end to the cyclone has one end adapted to receive the first portion of the virgin resin and upon rotation of a first auger therein to transfer a first portion of virgin resin to the cyclone; A second conduit which is connected at one end to the cyclone and at the other end to a third conduit, has one end adapted to receive a mixture from within the cyclone and the other end attached to the third conduit so that upon rotation of a second auger therein the mixture is transferred to the interior of the third conduit; the third conduit, which is supported within said first container, has one end disposed within the passageway so that upon rotation of the third auger the mixture is transferred to the interior of an in-line means for plasticizing; a motor which is attached to the first container is arranged to impart rotary motion to the third auger; and a drive means which causes the first and second augers to rotate. This drive means comprises a first, second, third, and fourth cog wheel, a first chain and a second chain. The first cog wheel is attached to a screw of the in-line means for plasticizing so as to cause rotation of this first cog wheel in response to any rotary movement of the screw. The first chain is adapted to couple said first cog wheel and said second cog wheel so as to cause rotation of the second cog wheel in response to any rotary movement of the first cog wheel. The second cog wheel is attached to the second auger so at to cause rotation thereof in response to any rotary movement of the second cog wheel. The third cog wheel is either attached to the second auger or to the second cog wheel so as to rotate in response to any rotary movement of the second auger. The second chain is adapted to couple the third cog wheel and the fourth cog wheel so as to cause rotation of the fourth cog wheel in response to any rotary movement of the third cog wheel. The fourth cog wheel is attached to the first auger so as to cause rotation of the first auger in response to any rotary movement of said forth cog wheel.

DETAILED DESCRIPTION OF THE INVENTION

Figure 1:
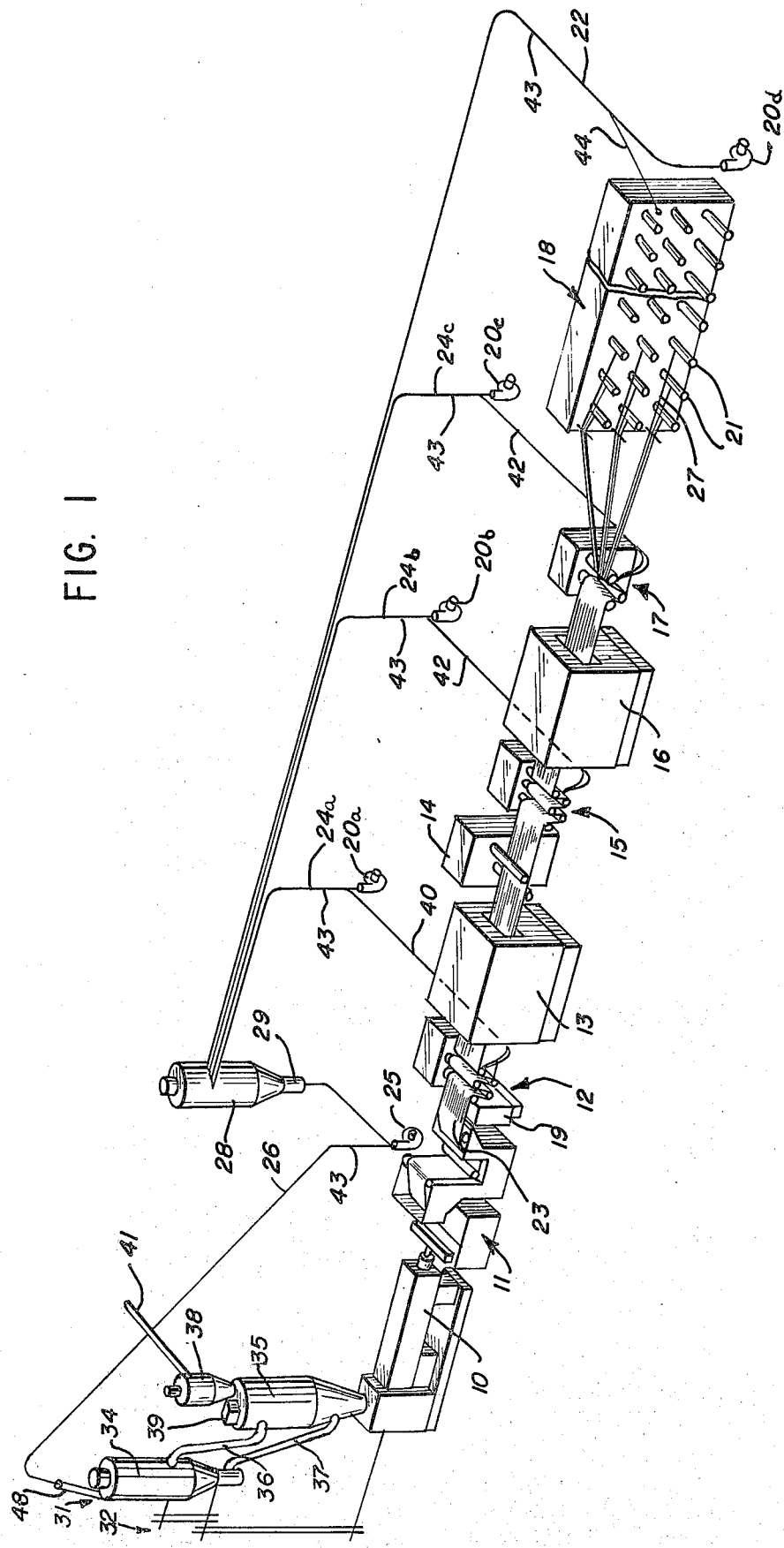
FIG. 1 is a perspective view of a typical film extrusion line with an on-line reclaim system which includes the means for feeding of this invention.

In FIG. 1, there is an extrusion line with a reclaim system of this invention comprising: an in-line extruder 10, a cooling bath 11, a slitting stand 19 which has an array of vertically oriented razor blades 23 anywhere from 1 to 10 blades/inch across the width of an extruded film, a first drive and tension control 12, an orientation oven 13, a delustering stand 14, a second drive and tension control 15, an annealing oven 16, a third drive and tension control 17, a winder stand 18, blowers 20a, 20b, 20c, and 20d and a blower 25, conduits 22, 24a, 24b, 24c and 26, a reclaim cyclone 28, a chopper 29, a feed system 31 of this invention, a drive means or coupling 32, a virgin resin cyclone 38, a container 34, a container 35, a means for conveying 36 and 37, the former for virgin resin and the latter for a mixture of virgin resin and chopped reclaim, and motor 39.

The operation of an extruder line with an attached on-line reclaim system of this invention is as follows:

Virgin resin enters cyclone 38 through inlet port 41 and is gravitationally fed into container 35. Container 35 is adapted to feed said resin into extruder 10 as for example through an open passageway 47 shown in FIG. 2. A gravity method of feeding is preferably used to transfer the virgin resin from container 35 into extruder 10. The virgin resin in the form of pellets fed into extruder 10 is extruded into cooling bath 11 and is then slit on stand 19. Edge trim 40 is recycled by blower 20a through conduit 24a to reclaim cyclone 28, then through a chopper or grinder 29 which converts all film passing therethrough into a chopped reclaim which is transferred in conduit 26 under the influence of blower 25 into the entry port 48 of container 34. The details of how material within container 34 is transferred to extruder 10 will be explained in detail while discussing FIG. 2. The inside diameter (I.D.) of conduit 24a for edge trim 40 is 4 inches and blower 20a attached thereto has sufficient power to move 1,000 cubic feet of air/minute (cfm). The remaining film less edge trim is oriented in oven 13 then treated at delustering stand 14 and then brought into an annealing oven 16 where it is oriented further. Loose ends 42, both before and after annealing oven 16 are fed back through 4 inch I.D. conduits 24b and 24c under the influence of a carrier stream moving at a rate of 1,000 cfm provided by blowers 20b and 20c to reclaim cyclone 28. Subsequent to annealing oven 16 the slit film or ribbon yarn 27 is taken to winder stand 18 shown schematically where it is either rolled on bobbins 31 or recycled as start-up scrap 44 through conduit 22 under the influence of air blown by blower 20d.

Air bleeds 43 are between about 10 to 15 feet downstream of blowers 20a, 20b, 20c, 20d and 25 and can consist of 18 inches of random holes, which range from ½ inch to ⅜ inch. The number and density of holes is varied depending upon the amount of bleed found necessary in order to have the system function smoothly, i.e., provide enough suction to carry the loose ends, edge trim, start-up scrap, etc. back to there claim cyclone without too much turbulence.

There are some limitations to the reclaim system of this invention in that if the apparent density of the chopped reclaim falls much below about 2 lb/cf then bridging problems occur. However, an apparent density of about 6 lb/cf can be easily handled in the reclaim system of this invention.

It is to be noted that a conventional reclaim cyclone such as disclosed in U.S. Pat. No. 4,014,462 (1977) and U.S. Pat. No. 3,797,702 (1974) can be used provided the reclaim contains at least about 25% or more edge trim, which is entangled with oriented film before being fed to chopping means 29 preferably employing a scissor-like cut. If much less than 25% of edge trim is present, then there occur bridging and balling problems from static charge buildup.

The extruder line disclosed in FIG. 1 without the on-line reclaim system is typical of extrusion lines for producing slit film fibers. The use of delustering stand 14 is optional as well as the number of blades/inch across the width. The locations of some of the elements of the line are optional and can be shifted. The edge trim 40, loose ends 42 and start-up scrap 44 ordinarily are collected separately and pelletized after being extruded from an off-line extruder.

Figure 2:
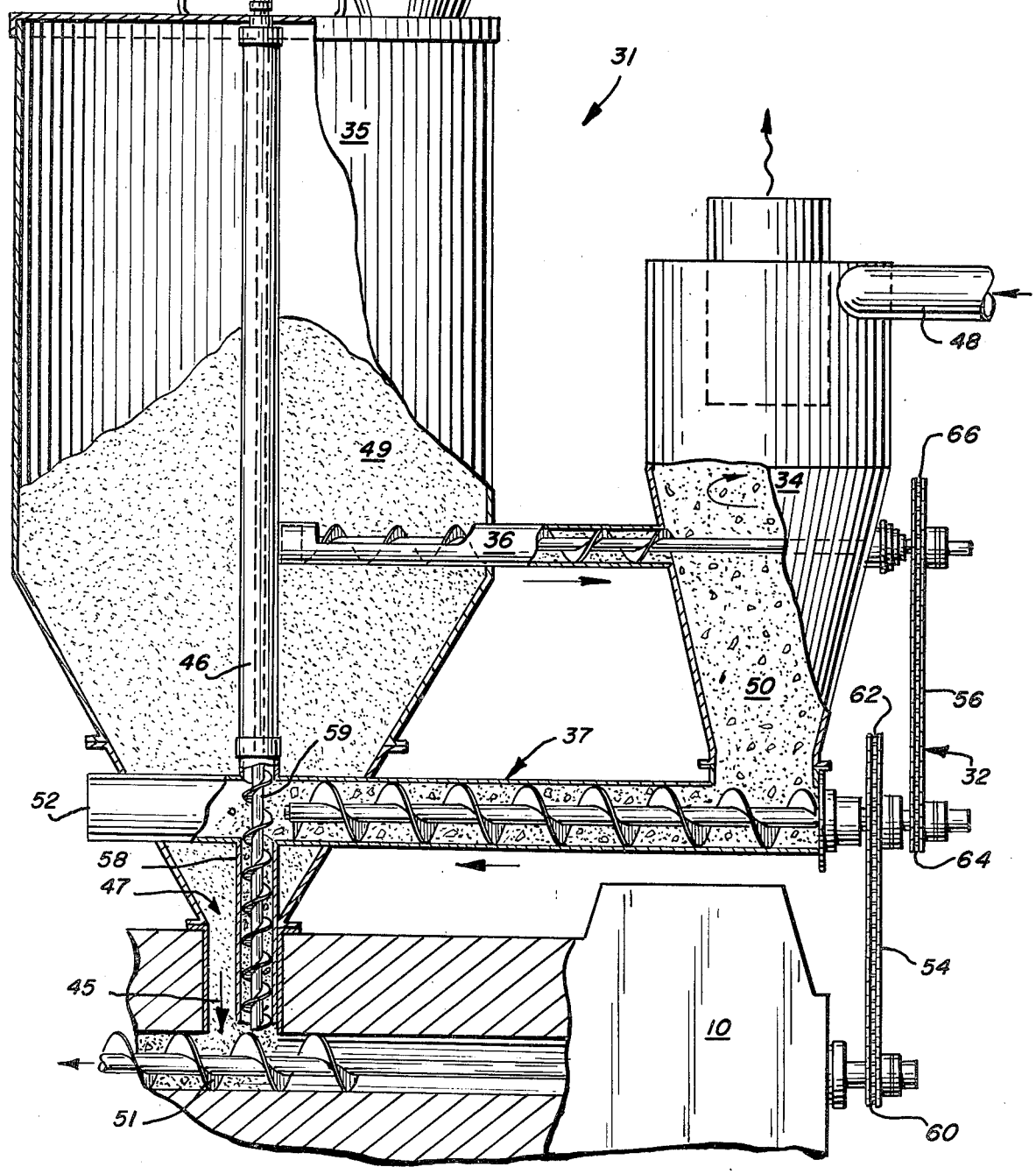
FIG. 2 is an enlarged perspective view of the feed system of this invention with a portion cut-a-way to reveal the interior and some walls in crosssection.

In FIG. 2, there is a feed system 31 of this invention which comprises: two containers 34 and 35 connected by two augers 36 and 37, a vertical auger 46, an extruder 10, a drive coupling 32 for coordinating the speeds of the auger 36 and 37 with the screw rate of extruder 10, and motor 39 which drives vertical auger 46.

Container 34, a cyclone, has attached thereto: a chopped reclaim port 48 and two augers 36 and 37. The first auger 36, which connects container 35 and container 34, is adapted to transfer virgin resin from container 35 into container 34 through a wall thereof. Due to flow caused by the carrier stream which is indicated by an arrow in container 34, virgin resin upon entering container 34 is swirled around and intermixed with incoming chopped reclaim. This intermixing aids the settling of chopped reclaim in the form of mixture 50. Auger 37 transfers mixture 50 to vertical auger 46.

Container 35 has attached thereto: a virgin resin cyclone 38 with inlet port 41, a vertical auger 46 powered by a motor 39, and augers 36 and 37. Virgin resin entering port 41 of cyclone 38 is separated from its carrier stream and gravitationally fed into container 35. It is important to maintain the level of virgin resin so as to keep auger 36 completely filled. The location of vertical auger 46 in opening 47 is very important to efficient feeding of extruder 10. Vertical auger 46 transfers mixture 50 into extruder 10 preferably upstream from gravitationally fed virgin resin 49. Location of feeding of virgin resin 49 is indicated by arrow 45. In the event that excess mixture 50 is transferred by auger 37 over that which is being transferred to extruder 10, there is a relief tube 52 which permits such excess to escape. Optionally, a declogging port can be made near opening 47 to insure uniform gravitational feeding of virgin resin 49 by periodic probing therethrough.

It is important that the operating rate of each of the augers 36, 37 and 46 is controlled or coordinated to the rate of extruder 10 so as to insure proper transfer of both virgin resin 49 and mixture 50. The chains 54 and 56 interact with the sprockets on cog wheels 60, 62, 64, and 66 and thereby coordinate the relative rates of augers 36 and 37 in relation to the operating rate of extruder 10. Cog wheel 60 on the shaft of the screw 51 of extruder 10 is the driving cog and is preferably torque limiting to avoid damage that might otherwise occur in the event augers 36 or 37 freeze.

The size, pitch and rate of turning of the screw of an auger determines the amount of material transferred by that auger. In general, the rates a which the various augers 36 and 37 operate relative to each other and to extruder 10 are such that for each 100 parts by weight (pbw) extruded by extruder 10, there are: between about 40 to about 90 and preferably, as for example in the case of polypropylene, between about 50 and about 80 pbw of virgin resin 49 transferred by auger 36; and between about 45 to about 100 and preferably, as for example in the case of polypropylene, between about 50 and about 90 pbw of mixture 50 transferred to augers 37 and 46. The case of polypropylene involves the extrusion of polypropylene films having a finished thickness after orientation is in the range of between about 0.25 mil and about 100 mils. Alternatively, the operating rates of augers 36 and 37 are coordinated so that mixture 50 has for each part by weight of chopped reclaim at least about 1½ and preferably at least 2 or 4, and more preferably at least 5 or more parts by weight of virgin resin. It is to be noted that in general the higher the parts by weight of virgin resin to chopped reclaim the better. If the parts by weight of virgin resin is not high enough, i.e., falls more and more below about 1½ parts by weight for each part by weight of chopped reclaim, then bridging in container 34 occurs more and more frequently. The consequences of this bridging are eventual overflow of container 34 and a stopping of the flow of material through auger 37. It is to be noted, however, that the effect upon extruder 10 will be minor because of the alternate feeding possible at 47 of virgin resin 49 from container 35.

The virgin resin used in the reclaim system of this invention can be in the form of hot-cut cylindrical pellets having a diameter in the range of between about 2 millimeters (mm) and about 7 mm and preferably in the range of between about 3 mm and about 4 mm and a length in the range of between about 1 mm and about 7 mm and preferably in the range of between about 2 mm to about 5 mm. As is known, the hot-cut process for forming cylindrical pellets involves chopping an extruded strand while still semi-molten which causes a rounding of all edges. Examples of such virgin resins are extrudable thermoplastics such as polyolefins, polamides, polyesters, polycarbonates, and the like.

It is to be noted that within opening 47, vertical auger 46 is upstream relative to virgin resin which is gravitationally being fed where indicated by arrow 45. This is important because it is desirable to have the upstream portion of the extruder screw 51 filled by mixture 50 rather than virgin resin 49. If the virgin resin 49 were to feed first, there would be little or no room in screw 41 for mixing 50. Further, it has been found empirically that extruder surging or extruder starving is much less frequent, if at all, with this feeding scheme. Auger screw 59 extends 0 to 6 inches and preferably 1 to 3 inches beyond housing 58 and is about 1/16 inch to about 4 inches and preferably ½ to about 1 inch from the top of the extruder screw 51. This arrangement permits some mixing to occur between virgin resin 49 and mixture 50 just prior to its entering extruder screw 51, but without indriducing so much turbulence as to interfere with uniform feeding of extruder 10.

EXAMPLE

An example of the extrusion line of FIG. 1 in operation is: Polypropylene having a melt flow of between 2½ to 4 grams/10 minutes at 250° C. is used. This polypropylene initially in the form of hot-cut cylinders 3-4 mm in diameter by 2-5 mm in length is extruded at a melt temperature of between 235°-250° C. into a water bath. The thickness determined immediately after the water bath is 5-6 mils. After orientation the thickness is between 1.8 and 2.2 mils. The water bath is at 38° C. The extruded film is moved through the system by drive means 12, 15, and 17 set at the following speeds, respectively, 130 ft/min., 900 ft/min., and 775 ft/min. The oven 13 is set at 190°-200° C. and the oven 16 is set at 175°-195° C. Blowers 20a, 20b, 20c, and 20d each of 7½ horsepower move 1,000 cfm of air and blower 25 of 2½ horsepower moves 1,000 cfm of air. The chopper means is a granulator Model 1526 sold by Polymer Machinery, Inc. with a screen size of ¼ inch. The low density reclaim has an apparent density of about 6 lb/cf, auger 36 transfers 60 pbw, and auger 46 transfers 80 pbw.

The above example is intended to be illustrative only. Variations thereon are readily apparent to one skilled in the art and are intended to be within the scope of the invention.

The invention which is claimed is:

1. An on-line process for reclaiming a portion of oriented and unoriented film produced on an extrusion line, said process comprising: entangling said oriented and unoriented film to form a collection thereof containing at least 25% by weight unoriented film; chopping said collection to form a chopped reclaim, positively transferring at least 1½ parts by weight of a virgin resin from a first container to a mixing zone in a second container while simultaneously transferring 1 part by weight of said chopped reclaim to said mixing zone of said second container; swirling said virgin resin and said chopped reclaim to form a mixture thereof; positively transferring said mixture through a conduit, to a plasticization zone which is within said extrusion line; and gravitationally transferring additional virgin resin from said first container to said plasticization zone downstream from where said mixture enters said plasticization zone.

2. The process of claim 1 wherein said oriented and unoriented film and said virgin resin are all polypropylene.

3. An on-line process for reclaiming a portion of oriented and unoriented film produced on an extrusion line, said process comprising: entangling said oriented and unoriented film to form a collection thereof containing at least 25% by weight unoriented film; chopping said collection to form a chopped reclaim, positively transferring at least 1½ parts by weight of a virgin resin from a container to a mixing zone in a cyclone while simultaneously transferring 1 part by weight of said chopped reclaim to said mixing zone; swirling said virgin resin and said chopped reclaim in said cyclone to form a mixture thereof; positively transferring said mixture through a conduit to a plasticization zone which is within said extrusion line; and gravitationally transferring additional virgin resin from said container to said plasticization zone downstream from where said mixture enters said plasticization zone.

* * * * *

UNITED STATES PATENT OFFICE
CERTIFICATE OF CORRECTION

Patent No. 4,353,851       Dated October 12, 1982

Inventor(s) Godfrey-Grant

It is certified that error appears in the above-identified patent and that said Letters Patent are hereby corrected as shown below:

Column 1, line 18, "chargess" should be --charges--.

Column 1, line 34, "soaking" should be --shaking--.

Column 4, line 10, "so at" should be --so as--.

Column 5, line 9 and 10, "bobbins 31" should be --bobbins 21--.

Column 5, line 19, "claim cyclone" should be --reclaim cyclone--

Column 7, line 8, "mixing" should be --mixture--.

Signed and Sealed this

Twenty-seventh Day of December 1983

[SEAL]

Attest:

GERALD J. MOSSINGHOFF

Attesting Officer       Commissioner of Patents and Trademarks